(No Model.) 2 Sheets—Sheet 1.

C. T. HOLLOWAY.
VEHICLE RUNNING GEAR.

No. 452,569. Patented May 19, 1891.

WITNESSES:
A. O. Babendreier.
F. P. Davis.

INVENTOR:
Charles T. Holloway,
BY Chas. B. Mann
ATTORNEY.

(No Model.) 2 Sheets—Sheet 2.

C. T. HOLLOWAY.
VEHICLE RUNNING GEAR.

No. 452,569. Patented May 19, 1891.

WITNESSES:
A. O. Babendreier
J. P. Davis

INVENTOR:
Charles T. Holloway,

BY Chas B. Mann
ATTORNEY.

UNITED STATES PATENT OFFICE.

CHARLES T. HOLLOWAY, OF BALTIMORE, MARYLAND.

VEHICLE RUNNING-GEAR.

SPECIFICATION forming part of Letters Patent No. 452,569, dated May 19, 1891.

Application filed February 20, 1891. Serial No. 382,148. (No model.)

*To all whom it may concern:*

Be it known that I, CHARLES T. HOLLOWAY, a citizen of the United States, residing at Baltimore city, in the State of Maryland, have invented certain new and useful Improvements in Vehicle Running-Gears, of which the following is a specification.

This invention relates to an improvement in the front running-gear of vehicles, the object being to provide a structure having greater strength and stability than the gear heretofore used.

With this end in view the invention consists in certain peculiar features of construction and combinations of parts, described hereinafter, and pointed out in the claims.

Figure 1:
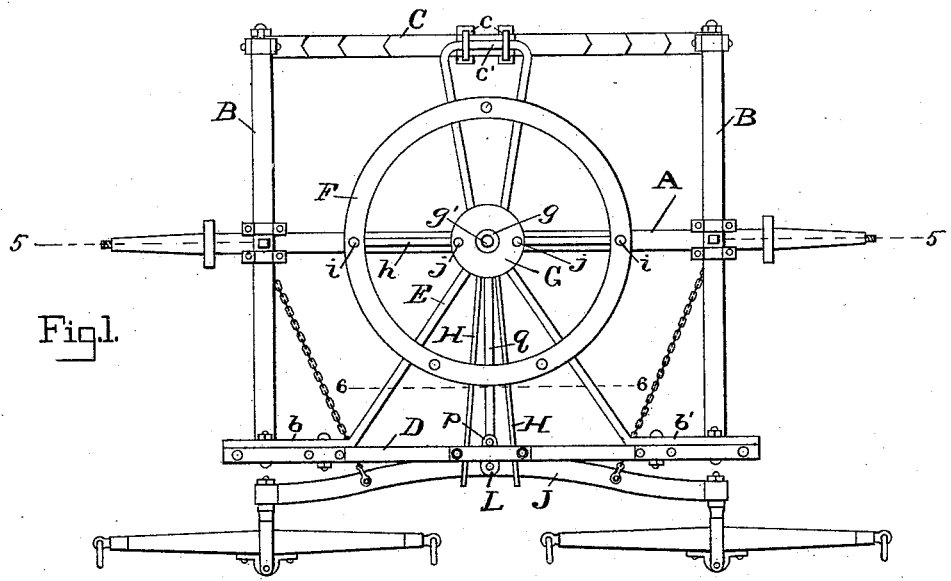
Figure 2:
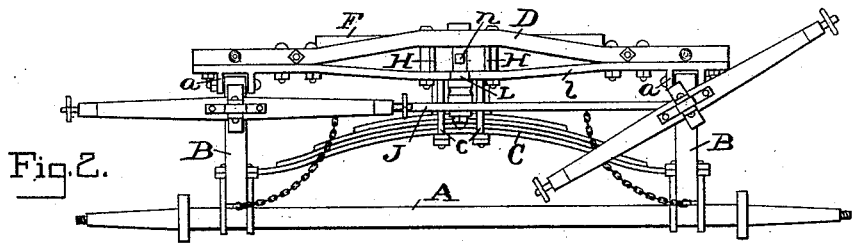
Figure 3:
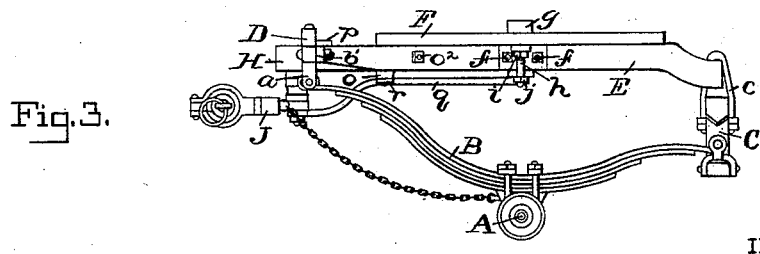
Figure 4:
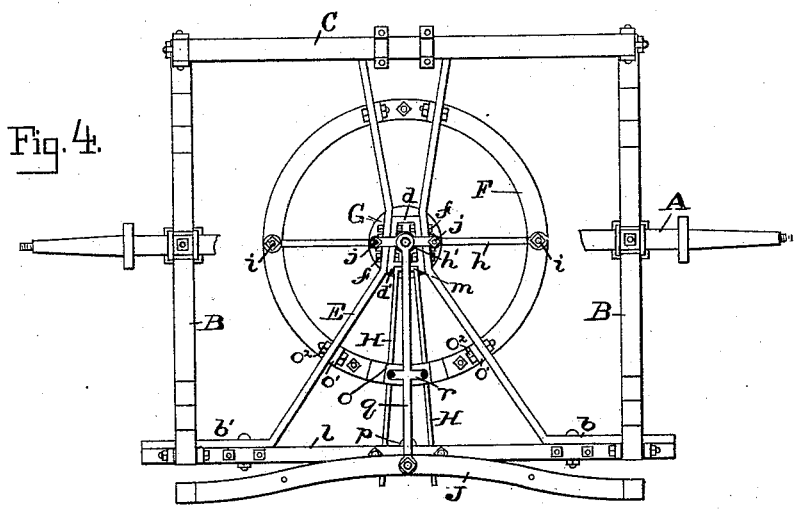
Figure 5:
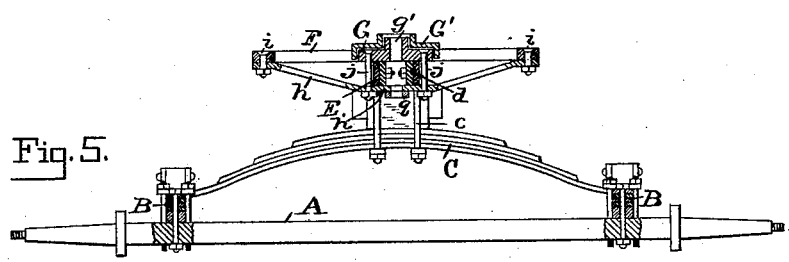
Figure 6:
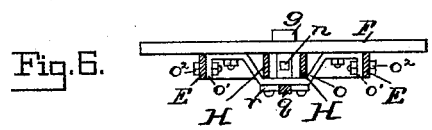
Figure 7:
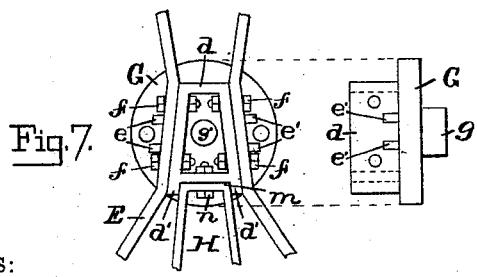

Referring to the accompanying drawings, illustrating the invention, Figure 1 is a top view of the gear; Fig. 2, a front view of the same; Fig. 3, a side view; Fig. 4, a bottom view; Fig. 5, a cross-section on line 5 5 of Fig. 1; Fig. 6, a cross-section on line 6 6 of Fig. 1, and Fig. 7 two detail views of a circular bearing-plate at the center.

In the drawings, the letter A designates the front axle; B, a pair of half-elliptical springs mounted thereon, one at each side; C, a reverse half-elliptical spring connecting the rear ends of the said side springs B and joined thereto by ordinary shackles, and D a splinter-bar connecting the forward ends of the side springs and joined thereto by joints $a$. A brace-bar E, made in one piece, is bolted at its end $b$ to one end of the splinter-bar D and extends diagonally therefrom to the king-bolt at the center, passing on one side of the same, and from thence nearly straight back to the rear cross-spring C, to which it is secured by clips $c$. It here doubles back, as shown at $c'$, and extends nearly straight to the center, again passing on the opposite side of the king-bolt, and thence diagonally to the opposite end of the splinter-bar, where its end $b'$ is bolted the same as the other end $b$.

The fifth-wheel F is mounted directly on the doubled-back brace-bar E and secured thereto. At the center of said fifth-wheel is a circular bearing-plate G, which also seats upon the said brace-bar E, and on its upper side has a boss $g$, at the center provided with a hole $g'$, through which the king-bolt is to pass. The bearing-plate G has on its under side a substantially rectangular flange $d$, forming a box, which fits between the two arms of the doubled-back brace-bar E. This plate also has on its under side lugs $e$ $e'$, two being adjacent to one side of the flange-box and two adjacent to the opposite side. These lugs take on the outside of the said arms of the brace-bar, and said arms are secured to the flange-box by bolts $f$. A stay-brace $h$ extends across beneath the brace-bar E and flange-box $d$ at the middle of the fifth-wheel, to which its ends are secured by bolts $i$. This stay-brace $h$ is connected by vertical bolts $j$ to the bearing-plate G and has at its center a boss $h'$, with a hole through which the king-bolt is to pass.

It will be observed that the doubled-back brace-bar E is rigidly connected with the splinter-bar, rear spring, fifth-wheel, and bearing-plate and gives great stability to the entire structure.

A socket-plate G' is designed to be secured to the upper gear on the vehicle-body, (not shown,) and fits over the bearing-plate G, as shown in Fig. 5. This socket-plate has a peripheral flange or rim $k$, which incloses the circular bearing-plate G and prevents the upper fifth-wheel plate (not shown) from working off the other, as will be apparent. This peripheral flange also lessens the strain on the king-bolt in turning.

The splinter-bar D is bent up at the middle (see Fig. 2) and has a stay-iron $l$ secured on its under side and forms a truss, and between the said splinter-bar and stay-iron extend the tongue-hounds H, which extend rearward. These hounds H are made of one continuous bar beneath the fifth-wheel and bearing-plate G, doubled back at the rear, as at $m$, to form the two sides of the hounds. The doubled-back portion $m$ of said bar fits up to the box-flange $d$ on the under side of the bearing-plate G, and is secured thereto by a bolt $n$. Short extensions $d'$ of said flange take on opposite sides of the hound-bar. A bent stay-iron $o$ supports the hounds H at the middle and is bolted to the under side of the fifth-wheel. The stay-iron $o$ also serves (see Figs. 4 and 6) as a means for connecting the fifth-wheel F, and the diagonal part of the arms of the brace-bar E for its ends $o'$ are bent downward at right angles and fit against the said brace-bar and are secured thereto by bolts $o^2$. The tongue of the vehicle (not shown) fits between the hounds H and beneath the splinter-bar and fifth-wheel, and is held in by the usual pin which is inserted through a lip $p$, projecting rearward from the splinter-bar D.

The doubletree J is located below the splinter-bar and pivoted on a bar L, projecting forward from the splinter-bar stay-iron. A stay-iron $q$ is provided for the doubletree and fits at its outer end over the pivot of the same, as shown in Fig. 4. This stay-iron extends rearwardly beneath the hound-stay $o$ and is provided with a cross-arm $r$, which is bolted to the hound-stay $o$. The stay-iron $q$ passes beneath the center of the fifth-wheel stay-brace $h$, where it has a circular head or boss through which the king-bolt passes.

It will be seen that the construction of gear is so connected and united as to be exceedingly strong and durable and capable of resisting strain upon it.

Having thus described my invention, what I claim as new, and desire to secure by Letters Patent, is—

1. In front running-gear of vehicles, the combination of a pair of half-elliptical side springs, a similar spring connecting the rear ends of the side springs, a splinter-bar connecting their front ends, a doubled-back brace-bar E, having the doubled-back part $c'$ rigidly connected with said rear spring, its two ends $b$ $b'$ with said splinter-bar, and with each of its arms passing on an opposite side of the king-bolt, a fifth-wheel F, mounted on said doubled-back brace-bar and rigidly connected thereto, and a central bearing-plate G, also mounted on said brace-bar and having on its under side a substantially rectangular box-flange $d$, which fits between the two arms of the brace-bar and is bolted thereto, as set forth.

2. In front running-gear of vehicles, the combination of a pair of half-elliptical side springs, a similar spring connecting the rear ends of the side springs, a splinter-bar connecting their front ends, a doubled-back brace-bar E, having the doubled-back part $c'$ rigidly connected with said rear spring, its two ends $b$ $b'$ with said splinter-bar, and with each of its arms passing on an opposite side of the king-bolt, a fifth-wheel F, mounted on said doubled-back brace-bar and rigidly connected thereto, a central bearing-plate G, also mounted on said brace-bar and having on its under side a substantially rectangular box-flange $d$, which fits between the two arms of the brace-bar and is bolted thereto, tongue-hounds H, extending beneath the splinter-bar, fifth-wheel, and central bearing-plate and bolted to said box-flange of the latter, and a stay-iron $o$, supporting the hounds at the middle and rigidly connected both to the fifth-wheel and the two arms of the brace-bar, as set forth.

In testimony whereof I affix my signature in the presence of two witnesses.

CHARLES T. HOLLOWAY.

Witnesses:
JNO. T. MADDOX,
F. P. DAVIS.